United States Patent [19]
Kestner et al.

[11] Patent Number: 5,364,301
[45] Date of Patent: Nov. 15, 1994

[54] PROCESSING SEA URCHINS FOR EXTRACTING GONADS

[75] Inventors: Michael T. Kestner, Bernard; Benjamin A. Baxter, Ellsworth, both of Me.

[73] Assignee: Marine Machines, Inc., Bernard, Me.

[21] Appl. No.: 156,093

[22] Filed: Nov. 22, 1993

[51] Int. Cl.$^5$ .............................................. A22C 29/00
[52] U.S. Cl. ........................................ 452/18; 452/12; 452/170; 452/160
[58] Field of Search ................ 452/18, 12, 170, 171, 452/157, 160

[56] References Cited

U.S. PATENT DOCUMENTS

| | | | |
|---|---|---|---|
| 3,495,874 | 2/1970 | Dean | 297/456 |
| 3,513,071 | 5/1970 | Fehmerling | 195/2 |
| 3,982,299 | 9/1976 | Kompan | 452/171 |
| 4,019,223 | 4/1977 | Baker | 452/160 |
| 4,195,543 | 4/1980 | Tapply et al. | 83/794 |
| 4,393,545 | 7/1983 | O'Donnell | 452/18 |
| 4,399,161 | 8/1983 | Nakamura et al. | 426/541 |
| 4,454,795 | 6/1984 | Ellis | 83/820 |
| 4,535,666 | 8/1985 | Fiori et al. | 83/795 |
| 4,538,327 | 9/1985 | Einarsson | 452/18 |
| 4,597,132 | 7/1986 | Elmer et al. | 452/170 |
| 4,663,805 | 5/1987 | Adcock | 452/12 |
| 4,674,374 | 6/1987 | Sadahiro et al. | 83/62.1 |
| 4,688,679 | 8/1987 | Lindgren | 209/691 |
| 4,710,999 | 12/1987 | Brunner et al. | 452/12 |
| 4,893,533 | 1/1990 | Harris | 83/13 |
| 4,953,295 | 9/1990 | Barradas et al. | 30/380 |
| 5,109,744 | 5/1992 | Syré et al. | 83/818 |
| 5,181,879 | 1/1993 | Lapeyre | 452/160 |
| 5,207,610 | 5/1993 | Ogawa | 452/110 |

FOREIGN PATENT DOCUMENTS

| | | |
|---|---|---|
| 2025761 | 3/1992 | Canada . |
| 2025762 | 3/1992 | Canada . |
| 2265502 | 10/1975 | France . |
| 54-28877 | 3/1979 | Japan . |
| 56-99744 | 8/1981 | Japan . |
| 58-183032 | 10/1983 | Japan . |

*Primary Examiner*—Willis Little
*Attorney, Agent, or Firm*—Daniel H. Kane

[57] ABSTRACT

A semiautomated machine (10) cuts a disk (60a) from the mouth side of sea urchin shells (60) for efficient extraction of gonads, the sea urchin reproductive organs, with minimal damage. The machine is capable of preserving intact the original five segmented star configuration. A conveyor (12) receives and retains sea urchins (60) with the mouth side of the sea urchin shells facing away from the conveyor. A cutter (15) is mounted over the conveyor at a cutting location (16). A relatively thin elongate cutting element (38) is spaced from the conveyor (12) and oriented generally transversely across the conveyor. An extended aligning plane (65,66) parallel to the conveyor is mounted on the opposite side of the elongate cutting element (38) from the conveyor (12) at the cutting location (16). The aligning plane (66) contacts the mouth side of the sea urchin shells and aligns and maintains orientation of the sea urchins with the mouth side of the sea urchin shells facing the aligning plane. The cutting element (38) is spaced a selected cutting distance from the aligning plane and cuts a disk of uniform thickness from the mouth side of sea urchin shells as they are transported by the conveyor (12) through the cutting location (16). The cutting distance and disk thickness is selected to expose the gonad lobes for removal without substantial injury. A spring system (72) spring loads the flexible conveyor surface for pressing the sea urchin shells against the aligning plane (66).

27 Claims, 7 Drawing Sheets

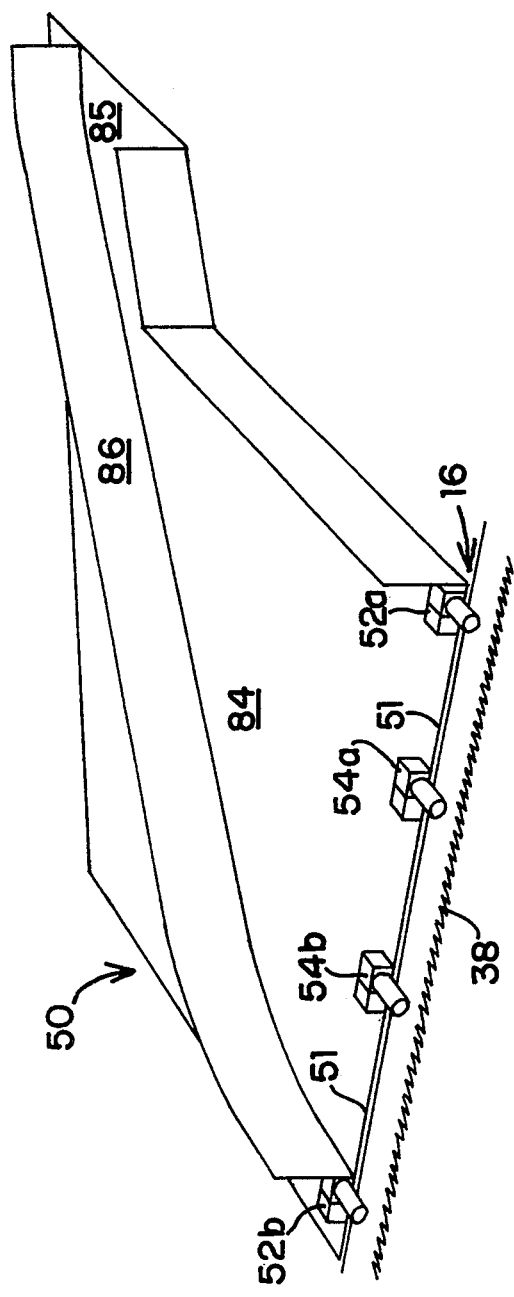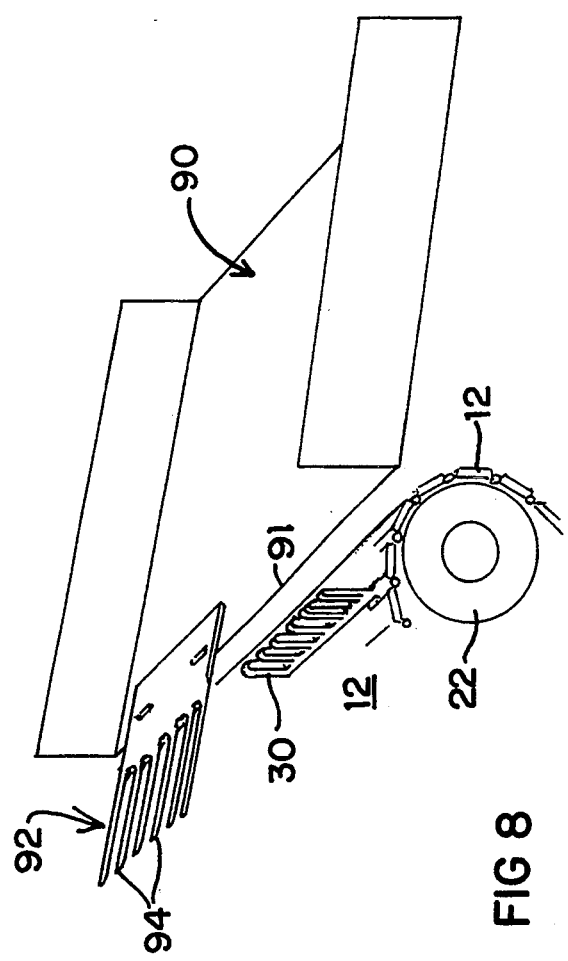

PROCESSING SEA URCHINS FOR EXTRACTING GONADS

TECHNICAL FIELD

This invention relates to a new machine and method for processing sea urchins in order to extract the sea urchin gonads. The sea urchin gonads are formed inside the sea urchin shell in a star configuration of five yellow/orange segments or lobes. The gonad lobes are joined together in the star configuration at the sea urchin's domed posterior end. The present invention provides automated cutting of a disk or cap from the anterior end of the sea urchin where the mouth is located. The automated severing of a disk of specified thickness exposes the gonad segments for efficient extraction with minimal damage. The new method frequently preserves intact the ring or star configuration of five lobes.

BACKGROUND ART

Sea urchins from the phylum Echinodermata are formed with a domed back side generally referred to as the posterior side and a flattened mouth side generally referred to as the anterior side. The sea urchin has spines covering all of its shell. However the spines are shorter and more uniform in size on the mouth side. A variety of sea urchin species share these characteristics.

Green sea urchins are generally found in latitudes above 40° north and below 40° south in all oceans. In North America they are commonly found from Atlantic Canada to Cape Cod on the Atlantic coast and from the Aleutian Islands to British Columbia on the Pacific Coast. The commercial size of green sea urchins generally ranges from 1½ to 4½ inches (3.8 to 11.4 cm) in diameter with spine lengths up to ½ an inch (1.3 cm).

Red sea urchins are commonly found from Juneau, Alaska to Mexico on the Pacific Coast. Red sea urchins are roughly double the size of the green sea urchin varieties and have longer spines, for example up to several inches (7.6 cm) in length.

Purple sea urchins occur in the region of overlap of red and green sea urchins on the Pacific Coast. Purple sea urchins are approximately the same size as the green sea urchins.

The traditional procedure for opening sea urchins to extract the gonad lobes is to use a hand held shell cracking tool. This tool is inserted into the mouth end of the sea urchin shell. The two halves of the tool are forced apart splitting open the shell. A similar cracking mechanism for cracking open the shells of sea urchins is described for example in the O'Donnell U.S. Pat. No. 4,393,545 issued in 1983 for "Processing of Sea Urchins".

Several problems occur according to the traditional procedure using such cracking tools. First, one or more of the sea urchin gonad lobes are generally broken in the process of cracking open the sea urchin shell. Second the gonad lobes are separated from the integral star shaped ring into separate lobes. Finally shell bits are occasionally driven into the gonad lobes and must be removed using tweezers. No mechanization of the traditional procedure has successfully resolved these problems.

OBJECTS OF THE INVENTION

It is therefore an object of the present invention to provide a new machine and method for processing sea urchins which presents a bowl or dome open on the mouth side for easily scooping out the gonad lobes while preserving the original natural condition of the reproductive organs.

Another object of the invention is to provide a machine and method for processing sea urchins which is semiautomated and greatly increases the speed and efficiency of gonad extraction by, for example, 30%–50%. The invention also improves the cleaning, packaging, and quality of the sea urchin gonad product.

A further object of the invention is to provide an automated machine and method for extracting gonads from sea urchins which is adaptable to the different species and configurations of sea urchins found along the coastlines of the world.

DISCLOSURE OF THE INVENTION

In order to accomplish these results the invention provides a machine for processing sea urchins for removing the sea urchin gonads. A conveyor is constructed for receiving and retaining sea urchins with the mouth side of the sea urchin shells facing away from the conveyor. The conveyor transports the sea urchins through a cutting location. A cutter is mounted over the conveyor at the cutting location. The cutter incorporates a cutting element constructed for producing a thin transverse cut across the mouth side of sea urchin shells generally parallel to the conveyor. The cutting element is spaced an adjustable distance from the conveyor.

According to the invention an extended aligning plane is oriented generally parallel to the conveyor at the cutting location on the opposite side of the cutting element from the conveyor. The aligning plane is arranged for contacting the mouth side of the sea urchin shells and for aligning and maintaining orientation of the sea urchins on the conveyor with the mouth side of the sea urchin shells facing and contacting the aligning plane as the sea urchins are transported through the cutting location.

The cutting element is spaced a selected cutting distance from the aligning plane for cutting a disk or cap from the mouth side of the sea urchin shells. The cutting distance is set to cut a disk having sufficient thickness to expose the gonad lobes for removal from the sea urchin shells without substantial injury to the gonad lobes.

The invention also provides a set of springs mounted on the side of the conveyor opposite the aligning plane. The springs are constructed to spring load the flexible conveyor surface in the direction of the aligning plane. The spring loaded conveyor presses the mouth side of sea urchin shells against the aligning plane as the sea urchins are transported thorough the cutter location.

In the preferred example embodiment the cutter is a band saw and the relatively thin cutter element is a band saw blade mounted across the conveyor. Other appropriate cutting elements may also be used such as a laser in which case the relatively thin elongate cutting element is a laser beam. A cutting stream of liquid may also be used for the cutting element.

The conveyor is formed with a jointed or otherwise flexible conveyor surface having openings for example in the configuration of elongate slots. The conveyor may be constructed from slotted links flexibly joined together with the slotted links providing the elongate slots or openings. The openings receive sea urchin spines on the posterior domed side of sea urchin shells. Inserting the sea urchin spines in the slotted openings facilitates retaining sea urchins oriented with the mouth side facing away from the conveyor. The conveyor surface is also generally formed with flights having sufficient height for pushing against the sides of sea urchins transported on the conveyor.

In the preferred example the aligning plane is a plate formed with depending vanes defining channels aligned in parallel along the direction of travel of the conveyor. The lower edges of the depending vanes also define the aligning plane. The vanes penetrate the spines contacting the mouth side of sea urchins. The channels face the conveyor and accommodate the sea urchin spines between the vanes. The channels and the edges of the channel vanes that define the aligning plane position and guide the sea urchins through the cutting location. The aligning plane extends upstream and downstream from the cutting location relative to the direction of travel of the conveyor. The primary area of the aligning plane is upstream from the cutting location.

In the preferred example, the set of springs is mounted on a fixed frame on the side of the conveyor supporting opposite the aligning plane. A relatively moveable conveyor plate is mounted on the other side of the set of springs from the fixed frame for contacting and pushing against the conveyor. The conveyor is formed with a flexible conveyor surface which is spring biased by the set of springs and relatively moveable conveyor plate for pushing sea urchins transported by the conveyor against the aligning plane. A variety of other springs may also be used for spring biasing the flexible conveyor surface of the conveyor.

For the most common sea urchin species, the green urchin, the cutting distance between the aligning plane and relatively thin elongate cutter element is typically set in the range of approximately ⅛" to 3/16" (0.3 cm to 0.45 cm). The cutting distance may be set according to the variety or species of sea urchin to be processed by the machine and according to the thickness of the shells, for example, by adjustment of the position of the aligner plane. Furthermore in the case of red urchins which have unusually long sea urchin spines, the spines can be cut to a manageable length during a sea urchin haircut before placement with the dome side against the conveyor.

For separating the disks or caps cut from the mouth side of the sea urchins, the invention provides a disk separator formed with a disk tray portion and disk chute portion. The disk separator is mounted over the conveyor at the cutting location adjacent to the cutting element on the downstream side. The disk tray is formed with a receiving edge aligned with the elongate cutting element for receiving the disks cut from the mouth side of the sea urchins. The disk chute is constructed for diverting the disks to the side of the conveyor while decapitated sea urchin shells pass below the disk separator on the conveyor.

In the preferred example, the elongate cutting element is a band saw blade and the receiving edge of the disk tray is formed with band saw blade guides. The band saw blade guides are constructed to maintain the band saw blade and receiving edge in alignment at the same level despite deformations of the band saw blade for receiving the cut disks or caps on the disk tray.

The invention also provides a new method of processing sea urchins for extracting the gonads from the sea urchin shells. The steps of the new method include orienting the sea urchins with the mouth side of the sea urchin shells facing toward a cutting location, aligning the sea urchins by pressing the mouth side of the sea urchin shells against an aligning plane, and spacing a thin elongate cutting element a selected cutting distance from the aligning plane at the cutting location. The cutting distance is set for cutting a disk or cap with sufficient thickness to expose the gonad lobes without substantial injury to the lobes for removal from the sea urchin shells.

According to the preferred method the step of conveying is accomplished by transporting the sea urchins on a flexible conveyor surface and spring loading the flexible conveyor surface in the direction of the aligning plane. Spring loading the conveyor causes pressing of the mouth side of sea urchin shells against the aligning plane to assure a constant cutting distance and constant thickness of the severed disk.

The step of aligning the sea urchins is accomplished by pressing the mouth side of the sea urchin shells against the aligning plate formed with parallel vanes defining the aligning plane. The vanes also define channels between the vanes aligned along the direction of travel of the flexible conveyor surface facing the flexible conveyor surface. As a result sea urchin spines are received in the respective channels and the edges of the depending vanes defining the aligning plane penetrate the spines and contact the mouth side for aligning and guiding the sea urchins using the spines.

The method also provides initial steps of receiving and engaging sea urchin spines on the dome side of sea urchins in slotted openings of the flexibly joined slotted links forming the flexible conveyor surface thereby orienting the sea urchins with the mouth side of the sea urchin shells facing toward the cutting location. The method of the invention is adaptable to all types and species of sea urchins, by, for example, varying the cutting distance and other appropriate modifications to accommodate the various sea urchin characteristics.

The method also provides steps for removing disks cut from the mouth side of sea urchin shells by aligning a receiving edge of a disk separator tray with the band saw blade on the downstream side and diverting disks or caps received on the disk separator tray to a separate location. The steps include conveying the decapitated sea urchin shells to another location. Aligning the receiving edge of disk separator tray with a band saw blade is accomplished by mounting band saw blade guides on the receiving edge of the disk separator.

Other objects, features and advantages of the invention are apparent in the following specification and accompanying drawings.

BRIEF DESCRIPTION OF THE DRAWINGS

FIG. 7 is a plan view from above and FIG. 7A is a perspective view from the side of the disk or cap separator including the disk tray portion and disk chute portion mounted over the conveyor.

FIG. 8 is a detailed fragmentary perspective view from above showing the shell tray at the downstream end of the conveyor for receiving decapitated sea urchin shells and showing the comb at the receiving edge of the shell tray for engaging the conveyor surface.

DESCRIPTION OF PREFERRED EXAMPLE EMBODIMENTS AND BEST MODE OF THE INVENTION

Figure 1:
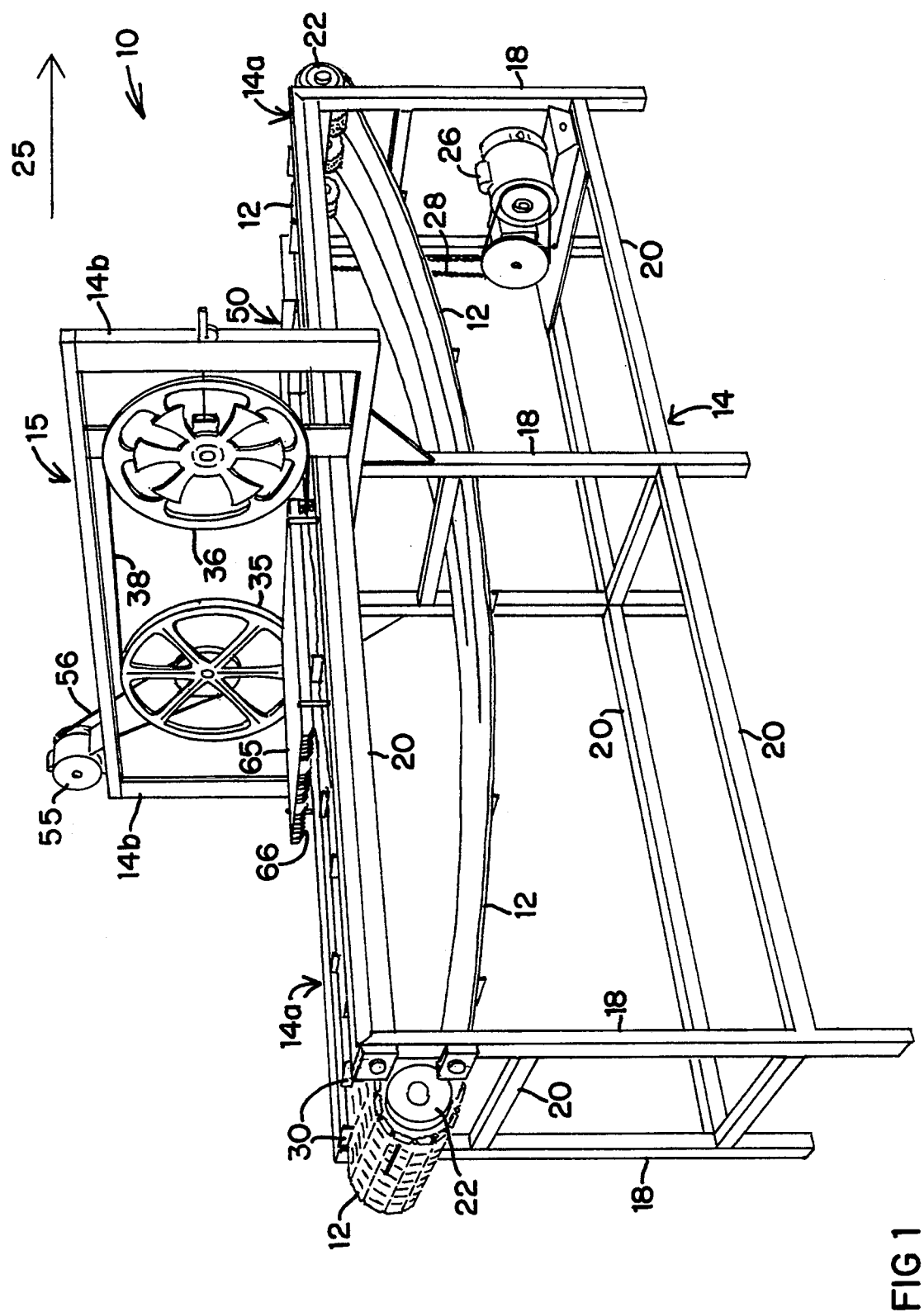
FIG. 1 is a side perspective view of the sea urchin processing machine according to the invention with some of the protective shields selectively removed for revealing various operating components of the machine.
Figure 2:
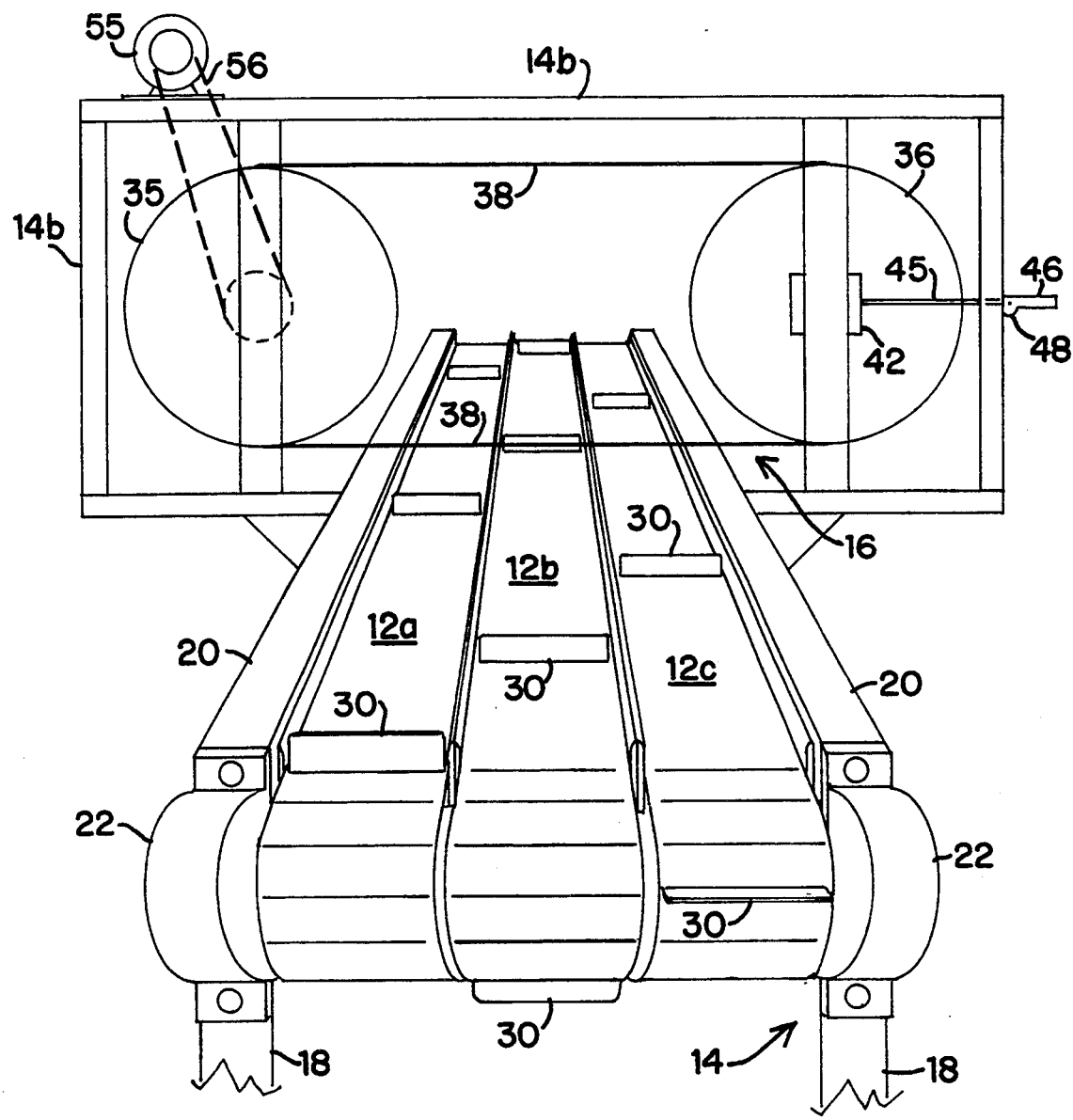
FIG. 2 is a front elevation view from the front end or upstream end of the sea urchin processing machine looking toward the cutting location and FIG. 2A is a detailed fragmentary view of the conveyor surface showing slots for receiving sea urchin spines.
Figure 3:
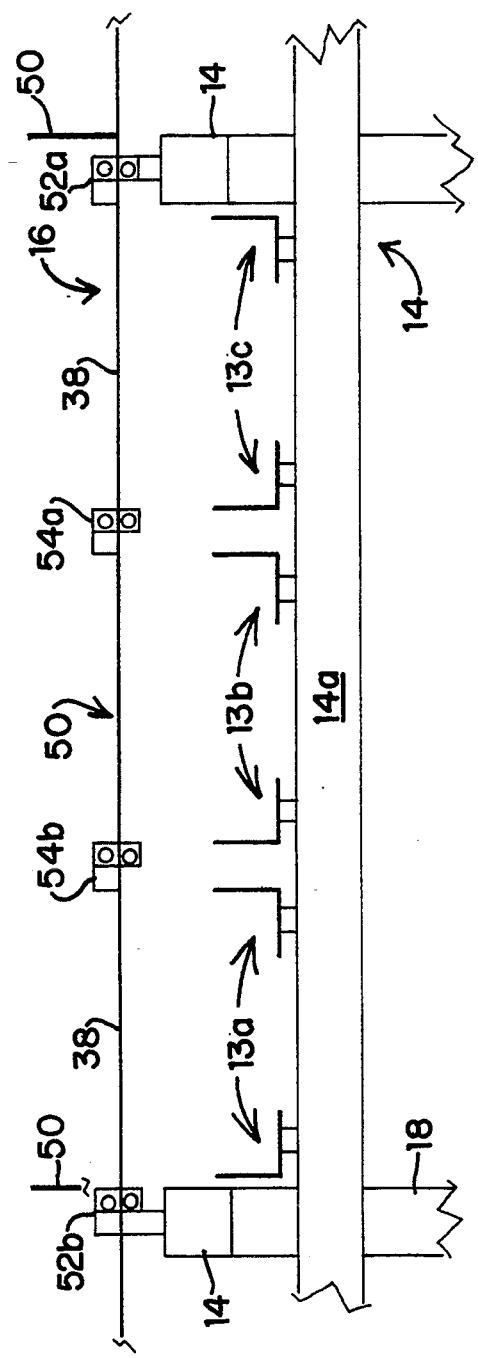
FIG. 3 is a simplified fragmentary diagrammatic end view from the front loading end of the machine with parts selectively removed to show the band saw blade guide bearings mounted on the frame and also on the disk or cap separator.

A sea urchin processing machine 10 according to the invention is illustrated in FIGS. 1, 2 & 3. The principle features of the machine 10 are a conveyor 12 mounted on an elongate frame 14, and a band saw 15 also mounted on the frame 14 at a cutting location 16 substantially midway between the ends of the conveyor 12 and the ends of the elongate frame 14. The frame 14 is constructed with legs 18 and horizontal struts 20 providing a rigid, fixed framework with an upper table 14a supporting the conveyor 12. The conveyor 12 is an endless loop flexible surface conveyor that passes over rollers 22 mounted for rotation at the ends of the horizontal table portion 14a of frame 14. The band saw 15 is mounted within a bridge 14b of the frame 14 which extends over the conveyor 12 at the cutting location 16.

Referring to the example of FIG. 1, the direction of travel of the conveyor is indicated by arrow 25. The left hand end of the conveyor is therefore referred to as the upstream end where fresh whole sea urchins are placed on the conveyor. The right hand end of the conveyor is referred to as the downstream end where decapitated sea urchin shells are removed from the conveyor 12 for extracting gonads. The conveyor is driven by a motor 26 mounted on the frame 14 having, for example, a chain drive 28 coupled to the roller 22 on the downstream end of the conveyor 12.

Figure 2A:
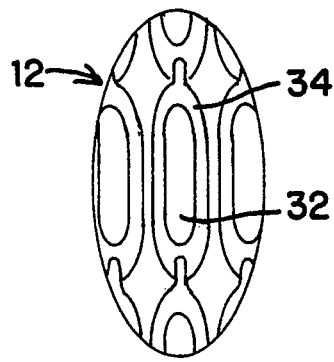

As shown in FIG. 2 the conveyor 12 may consist of multiple conveyor belts or tracks 12a, 12b, 12c all driven by the downstream roller 22 for processing e.g. three rows of sea urchins simultaneously. Each conveyor segment or track is formed with lands 30 with appropriate height for pushing sea urchins along the conveyor. The conveyor 12 also holds sea urchins by the sea urchin spines extending into slots 32 formed by the small scale loop or slotted link structure 34 of flexible conveyor 12 shown in the detailed fragmentary view of FIG. 2A. The flexibly interconnected slotted links or loops 34 provide a flexible surface conveyor so that the conveyor can be locally spring loaded at the cutting location as hereafter described. The sea urchin is advantageously pressed into the conveyor so that spines from the posterior dome of the sea urchin facing the conveyor are inserted into the loops to assist in retaining the sea urchins on the conveyor.

Figure 2B:
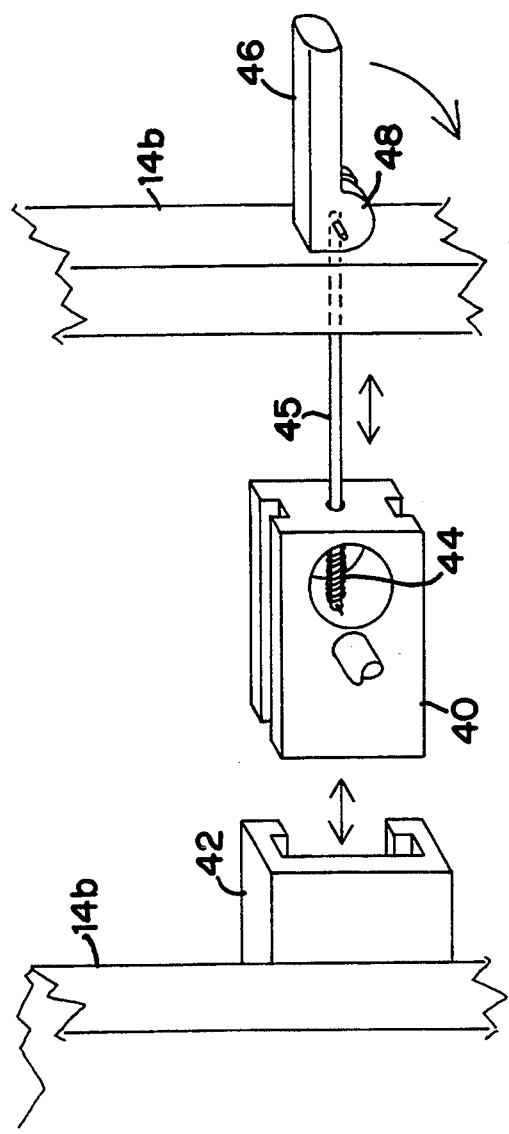
FIG. 2B is a detailed fragmentary exploded perspective view of the mechanism mounted on the frame for tensioning and releasing the band saw blade.

Referring in particular to FIGS. 2 and 3, the band saw 15 consists of band saw rotors 35 and 36 and endless band saw blade 38. The rotors 35,36 are mounted vertically for rotation on horizontal axes with the lower portion of the band saw blade 38 positioned at the cutting location 16 for decapitating sea urchin shells as hereafter described. A mechanism for spring tensioning and releasing the band saw blade 38 is illustrated in FIG. 2B. One of the rotors 35 is mounted for rotation on the bridge portion 14b of the frame 14. The other rotor 36 is mounted for rotation on a sliding block 40 which slides in track 42 secured to the bridge portion 14b of the frame 14. The band saw blade 38 and rotor 36 are tensioned against spring 44 by an extending arm 45 and handle 46 when the handle is forced to a vertical position so that the camming surface 48 of handle 46 withdraws the arm 45 and tensions the spring 44. The spring tension and band saw blade 38 are released with handle 46 in the horizontal position.

Mounting of the band saw blade 38 at the cutting location 16 is shown in the detailed fragmentary diagrammatic end view of FIG. 3. In FIG. 3 the band saw blade 38 is shown in relation to the frame 14, and the disk or cap separator 50. Each of the conveyor tracks 12a, 12b, 12c (not shown in FIG. 3) are to be supported in angle iron conveyor track supports 13a, 13b, 13c in turn secured in fixed position on the conveyor table 14a of the frame 14. The band saw blade 38 passes through blade guides 52a and 52b mounted on the fixed frame 14 at the sides of the frame. The band saw blade 38 also passes through blade guides 54a and 54b mounted between the sides on the receiving edge 51 of the disk or cap separator 50. The cap separator 50 is formed with a tray 84 for receiving disks or caps cut from the anterior mouth side of sea urchins and a chute 85 for diverting the caps to the side of the conveyor all as subsequently described with reference to FIGS. 7 and 7A. The blade guides 54a and 54b are constructed to assure alignment between the band saw blade 38 and the receiving edge of the disk separator 50 so that the disks or caps 60b are separately diverted from the decapitated sea urchin shells 60a remaining on the conveyor.

As shown in FIGS. 1 & 2, the band saw rotor 35 is mounted for rotation on the fixed frame bridge 14b and is driven by electric motor 55 and chain drive or belt drive 56. As previously mentioned the conveyor roller 22 on the downstream end is driven by electric motor 26 and chain drive 28. In both cases, hydraulic drive motors can be used instead of electric motors particularly for driving multiple machines from a single source of hydraulic power.

Figure 4:
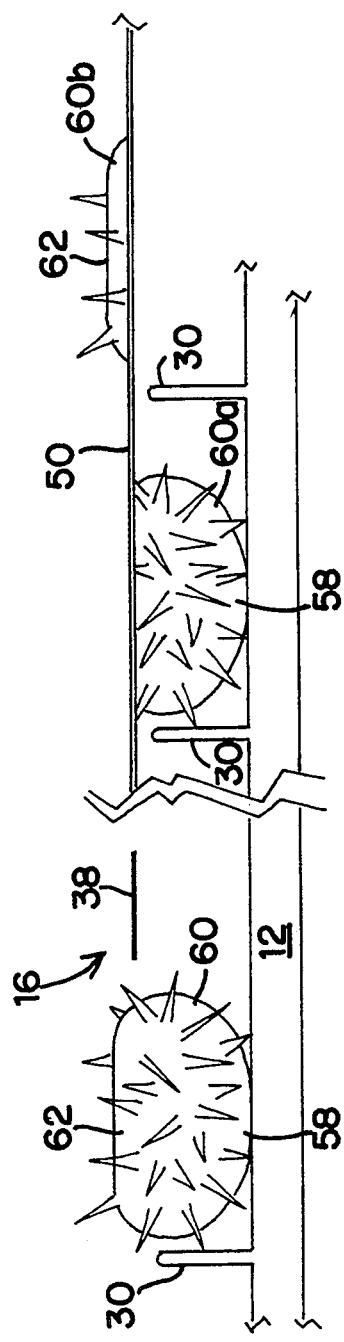
FIG. 4 is a detailed diagrammatic view of sea urchins on the conveyor before and after decapitation by the sea urchin processing machine.

As hereafter described, the elements of the sea urchin processing machine 10 at cutting location 16 are constructed and arranged for cutting a cap or disk from the anterior side of the sea urchin, the relatively flat side where the mouth is located. As shown in FIG. 4, the dome shaped side or posterior side 58 of the sea urchin 60 faces the conveyor with spines extending into slots of the slotted links forming the flexible surface of conveyor 12. The anterior side or mouth side 62 of sea urchin 60 faces away from the conveyor in the direction of the band saw blade 38 at the cutting location 16. After passing through the cutting location, a disk or cap 60b is cut from the anterior side of sea urchin 60 leaving a decapitated sea urchin shell 60a. A cap or disk 60b of sufficient thickness is cut from the sea urchin shell 60a for exposing the sea urchin gonads to be extracted without injury to the lobes. The following configuration of elements at the cutting location 16 as shown in FIGS. 5 and 5A accomplishes this task.

Figure 5:
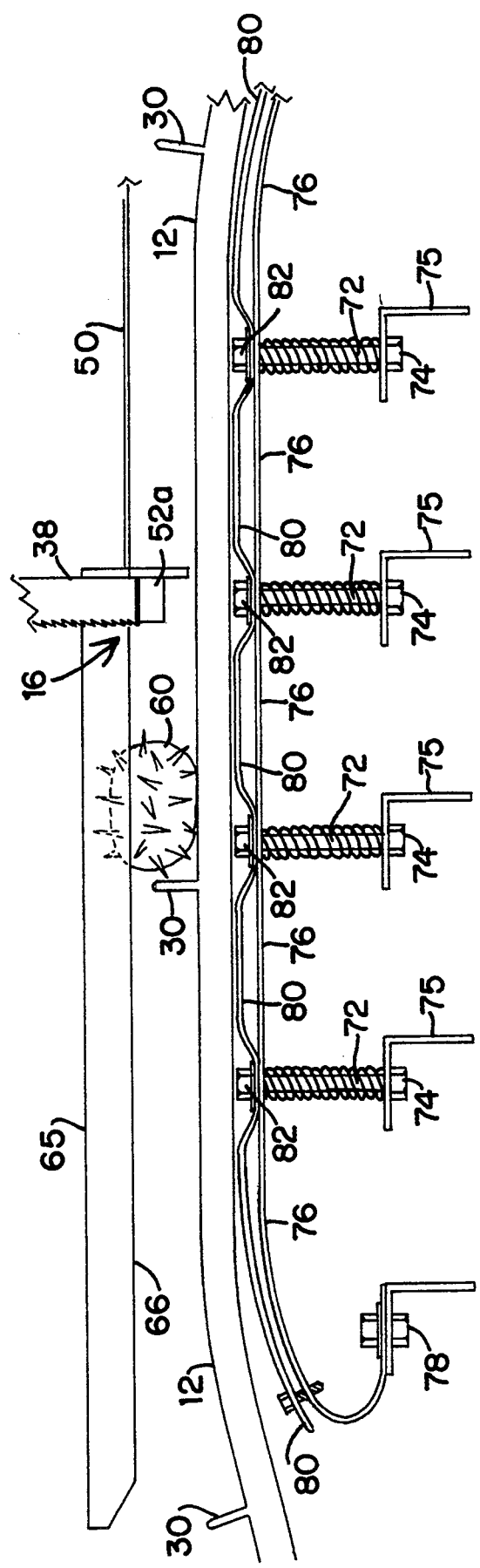
FIG. 5 is a detailed diagrammatic side view showing the relative positions of the aligning plate and plane, elongate cutting element, flexible conveyor surface, and spring biasing system at the cutting location generally at the center of the sea urchin processing machine.
Figure 5A:
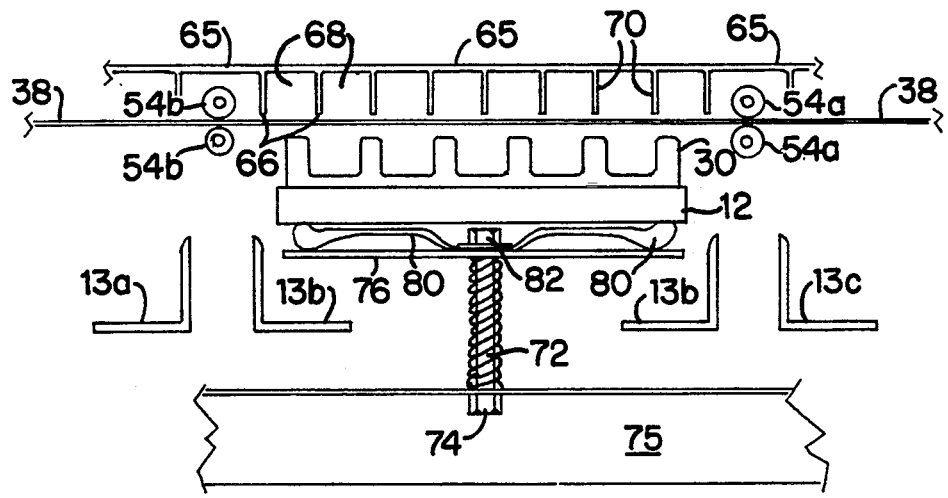
FIG. 5A is a detailed fragmentary end view of the cutting location from the end of the conveyor showing the relative positioning of the aligning plate and plane, elongate cutting element, conveyor, and spring biasing system.

As shown in FIGS. 5 and 5A, a so-called spine aligner plate 65 is mounted in a fixed position relative to frame 14 over the conveyor 12 above the cutting blade 38. That is, the aligner plate 65 is on the side of the cutting blade 38 opposite the conveyor 12. The aligner plate 65 extends upstream from the cutting location of blade 38 substantially parallel to the conveyor to a position slightly downstream of the cutting location of blade 38. Again upstream and downstream designations are given relative to the direction of travel 25 of the conveyor 12. The vanes 70 which define the aligning surface or plane 66 of the spine aligner plate 65 contact the anterior side 62 of sea urchins 60 on conveyor 12 and align and maintain the orientation of the sea urchins with the relatively flat mouth side facing and contacting the aligning plane 66.

Figure 5B:
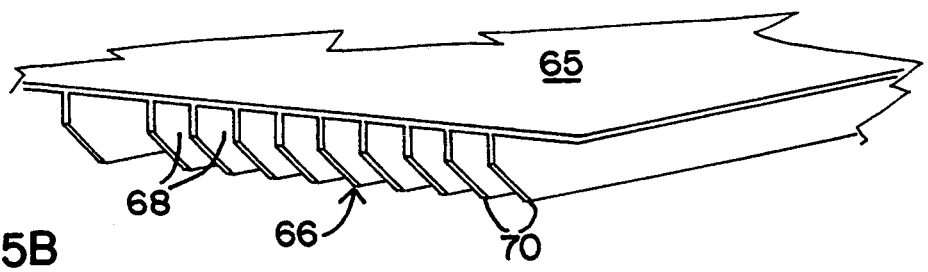
FIG. 5B is a detailed fragmentary plan view of the undersurface of the aligning plate.

As shown in FIGS. 5A and 5B, the aligner plate 65 is formed with channels 68 defined by downwardly directed channel vanes 70 aligned along the direction of travel of the conveyor. The channels 68 receive sea urchin spines while the edges of the channel vanes 70 penetrate the spines and contact the sea urchin anterior side for guiding and aligning the sea urchins through the cutting location. According to FIGS. 5 and 5A, the band saw blade 38 is maintained by the blade guides a fixed distance below the aligning plane 66 defined by the bottom edges of the channel vanes 70. This distance is selected according to the sea urchin species and characteristic shell thickness for cutting and removing a disk of sufficient average thickness to expose the gonad lobes for removal without substantial injury. In the case of green sea urchins, this distance and cutting thickness is in the order of ⅛"-3/16" (0.3-0.5 cm).

The next component below the saw blade 38 is the conveyor delivering sea urchins to the cutting location. In order to provide the desired cooperation between conveyor 12 and aligner plate 65, the conveyor 12 is spring loaded across the area of the conveyor under the aligner plate 65 in the direction of the aligning plane 66 of aligner plate 65 as shown in FIGS. 5 and 5A. Spring biasing is accomplished by springs 72 mounted on spring shaft bolts 74 secured to and extending vertically upward through angle iron frame elements 75. The frame elements 75 for springs 72 are in turn secured to the conveyor table portion 14a of machine frame 14 below each of the conveyor track guides 13a, 13b, 13c of the conveyor table 14a.

The spring forces of springs 72 bear directly against a flexible sheet 76 of spring steel mounted over each of the conveyor track guides 13a, 13b, and 13c. The flexible metal sheets 76 are secured at one end to the conveyor table 14a by bolts 78 and are folded over the conveyor track guides 13a, 13b, 13c to lie below the conveyor tracks or segments 12a, 12b, 12c. The flexible metal sheets 76 are formed with holes through which pass the spring shaft bolts 74 so that the springs 72 bear on washers directly against the sheets 76. The flexible metal sheets 76 are spring biased in the upward direction by springs 72 but can ride up and down on the spring shafts 74 to accommodate different size sea urchins between the spine aligner plate 65 and conveyor 12.

In order to provide a low friction wear surface for the conveyor segments 12a, 12b, 12c to ride over, the flexible metal sheets 76 are covered with wear strips or layers 80 of low friction plastic such as ABS plastic. The plastic layers 80 are secured to the tops of the flexible metal sheets 76 by nuts 82 placed on the upper ends of the spring shaft bolts 74. It is the low friction plastic layers 80 that bear directly against the undersurfaces of the flexible conveyor tracks or belts 12a, 12b, 12c. The springs 72 therefore flexibly spring bias the conveyor 12 composed of conveyor tracks 12a, 12b, 12c in an upward direction by way of the flexible metal sheets 76 and low friction plastic layers 80.

As shown in FIGS. 5 and 5A, the spring loading system for the conveyor 12 generally covers the area below the aligner plate 65. It extends primarily upstream from the cutting location 16 of band saw blade 38 and slightly downstream from the cutting location, enough to complete the accurate cutting of a disk or cap from the anterior mouth side of sea urchins. As sea urchins approach the spring loaded area of the conveyor, there is a slight rise in the conveyor surface and the sea urchins in turn are lifted and pushed against the lower edges of the downwardly directed vanes 70 defining the aligning plane 66 of the aligner plate 65. It is the relatively flat anterior side or mouth side of the sea urchins that is pressed against the aligning plane 66 defined by the lower edges of the vanes 70 on plate 65. This assures that the sea urchins 60 will be properly oriented and decapitated with removal of a disk or cap of constant thickness selected for the particular species. This thickness of the cap or disk is set by the fixed distance between the band saw blade 38 and the aligning face 66 of the aligning plate 65 provided by the lower edges or ends of the channel side walls or vanes 70 of the aligning plate 65.

It has generally been found that a row of 3-5 helical springs spaced along each conveyor track guide 13a, 13b, 13c is sufficient to spring load the desired area under the aligner plate 65. Instead of helical springs, any suitable spring mechanisms can be used to achieve the desired spring biasing of conveyor 12 in the direction of the aligner plate 65. It is also noted that while the conveyor 12 rises toward the aligner plate 65 in response to the spring biasing, the conveyor also falls or drops away to a lower level downstream from the cutting location 16 and spring biasing area. This permits decapitated sea urchin shells to pass below the disk separator tray 50 which is aligned with the band saw blade on the downstream side all as hereafter described.

The position of the transverse cut is critical and must cleanly divide a shell disc surrounding the mouth from the gonad mass at the five points where the gonad lobes come closest to the anterior side of the shell. As described above, accurately positioning of the shell against the cutting element is accomplished by three devices. First, the spine aligner plate 65 with depending vanes 70 orients the flattened mouth surface of the shell in the upward direction and allows the machine to ignore the variations in spine length by individual urchin or species. The spine aligner plane 66 incorporates the narrow metal ridges or vanes 70 spaced at approximately ½ inch intervals and running parallel to the direction of travel of the conveyor. The upturned mouth surface of the urchin shell is pressed against the vanes. These vanes, each no wider than e.g. 40 thousandths of an inch, penetrate the spine canopy as the urchin slides against them. After several inches of travel pressed against this surface, all urchins, regardless of size or spine length, will be set at a uniform elevation against the edges of the depending vanes 70 with reference to the exterior surface of the mouth side of the shell. The spine aligner is adjustable with respect to the elevation of the cutting element so that adjustments within several 100ths of an inch may be achieved for the position of the critical cut. This adjustment, sometimes required to allow for differences in shell thickness, may be accomplished by the use of shims installed at the base of spine aligner mounting pedestals.

Second, the series of positioning and biasing springs 72 are compressed below the conveyor surface, mounted on the side of the conveyor opposite the aligning surface. The biasing springs 72 allow the machine to accommodate all sizes of urchin shells by maintaining constant pressure of the mouth surface against the spine aligner 65. The spring-loaded conveyor maintains this orientation through the cutting location 16.

Third, the bearing guides 52a, 52b, 54a, 54b make possible subtle adjustments to the position of the cutting element within thousandths of an inch. The bearing guides carry the rolling bearings for the band saw blade. In the case of fluid or laser cutting elements, appropriate bearing guides would support the fluid jet or optical targeting devices. In any case, bearing guides determine the absolute elevation of the cutting tool or element. The bearing guides are mounted on the upstream edge or receiving edge of the "cap separator" 50 which removes the severed disc 60a away from the decapitated urchin body 60b following the cut, and diverts the discs to a waste bin as hereafter described. This device provides a tray 84 of sheet material positioned immediately beyond the cutting blade or device and exactly in the plane of the blade or device so that it forms a dividing plane between the severed disc or cap and the decapitated sea urchin body.

Figures 6A, 6B, 6C:
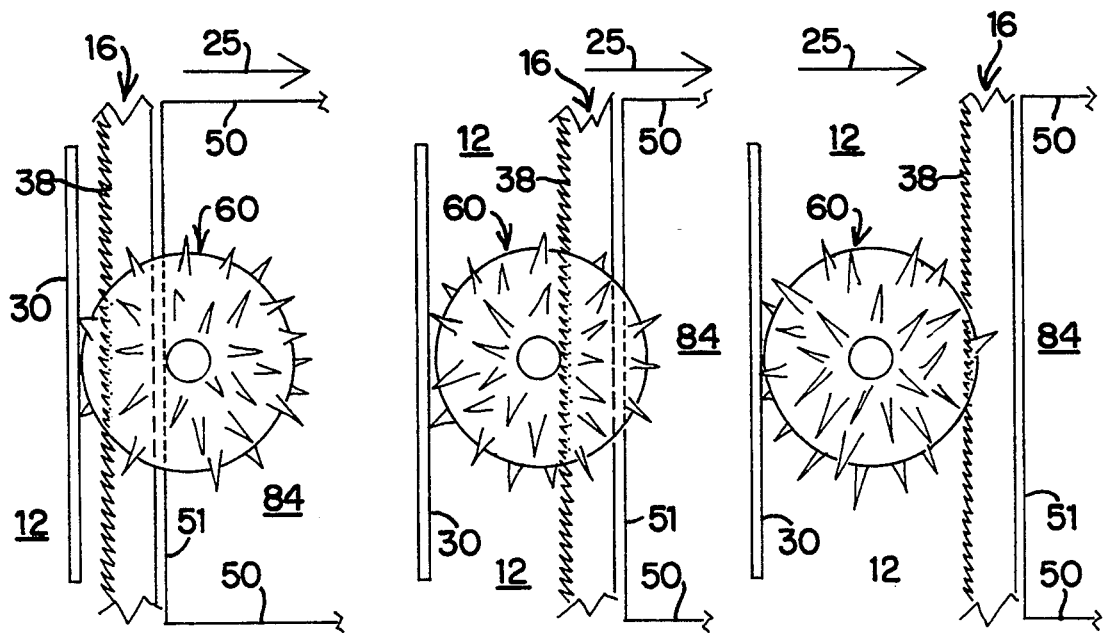
FIGS. 6A, 6B, 6C, & 6D are detailed fragmentary plan views showing a band saw blade at different positions through a sea urchin shell while cutting a disk or cap from the mouth side of the sea urchin shell.
Figure 6D:
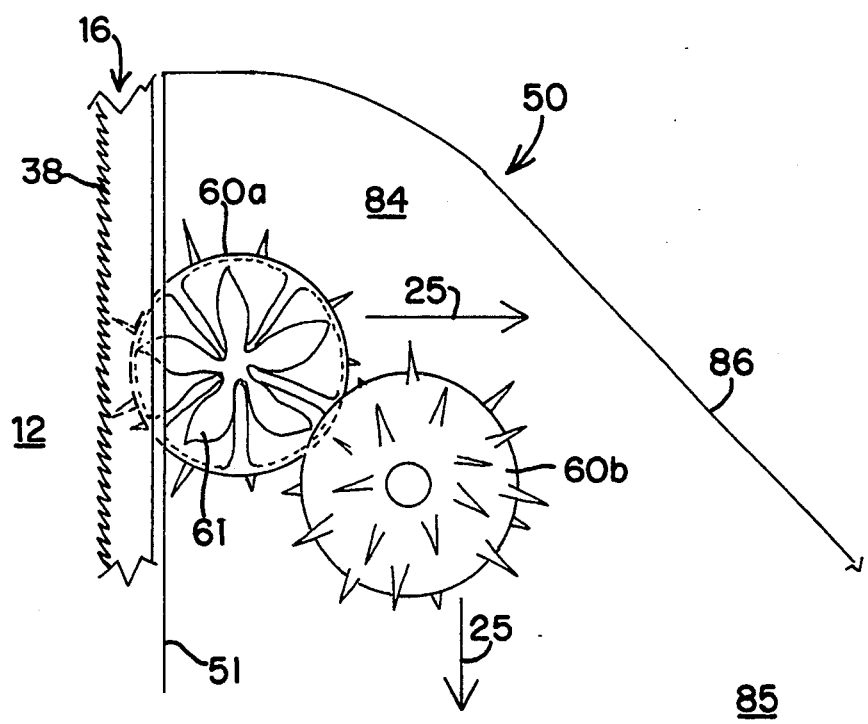

The fragmentary simplified diagrammatic plan views of FIGS. 6A, 6B, 6C, & 6D, illustrate the severing of a cap or disk 60a from a sea urchin 60 leaving the decapitated sea urchin shell 60a and exposed five star gonad lobes 61 at the cutting location 16. The saw blade 38 at cutting location 16 initially encounters greater resistance across a longer cutting line at the side of urchin 60 on conveyor 12 adjacent to flight 30 as shown in FIG. 6A. As the saw blade 38 progresses through the sea urchin 60 there is lower resistance because the blade encounters shell material only at the edges as shown in FIG. 6B. In FIG. 6C the blade encounters the greater resistance while cutting through the far side. The severed cap 60b passes over the leading edge 51 of the disk separator 50 which forms a disk tray 84 in alignment with saw blade 38. The decapitated sea urchin shell 60a passes below the disk separator 50 on conveyor 12. The caps or disks 60b are diverted by the chute portion 85 of disk separator 50 to the side of the conveyor as shown in FIG. 6D while the decapitated sea urchin shell 60a progresses in the conveyor direction 25.

Figure 7:
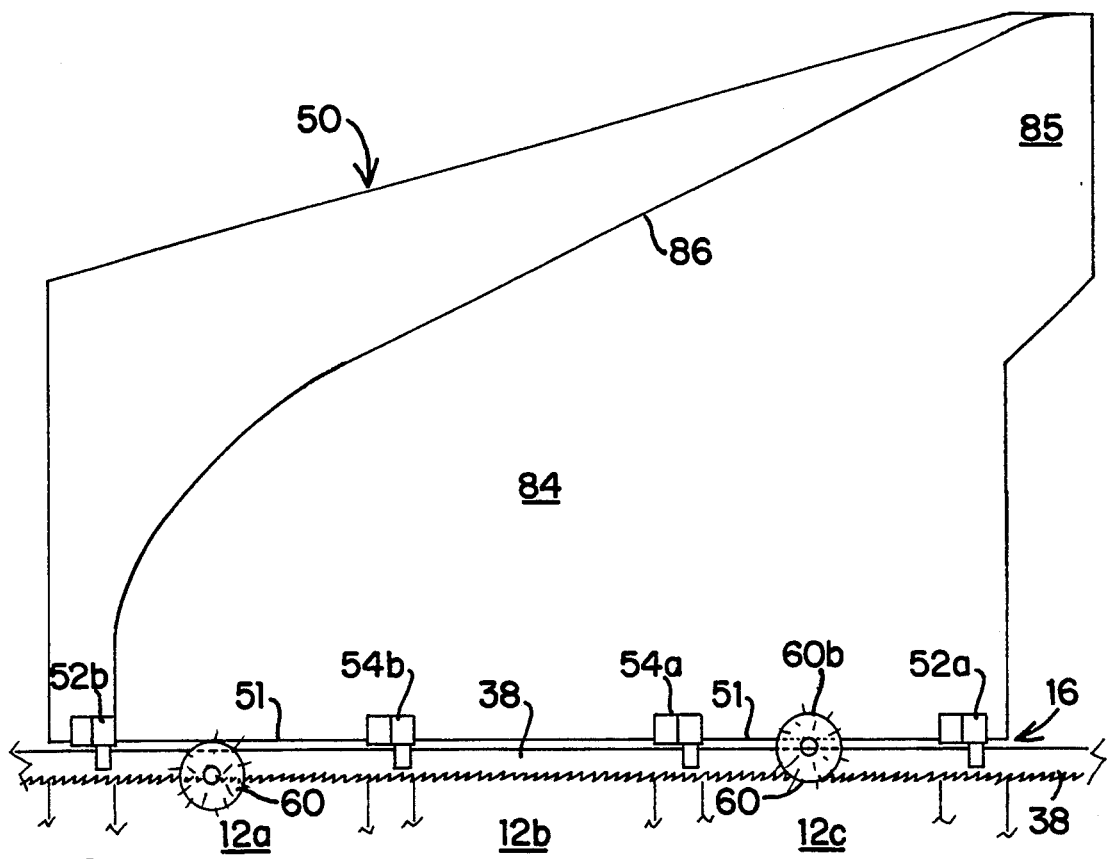

The cap separator or disk separator 50 is shown in further detail in FIGS. 7 and 7A. The disk separator 50 includes a tray portion 84 and a chute portion 85 and is mounted on the frame so that the receiving edge 51 of the tray portion 84 of disk separator 50 is in substantial alignment with the band saw blade 38. As heretofore described the band saw blade 38 is held at the cutting location 16 by blade guides 52a and 52b which are also secured to the fixed frame. The band saw blade 38 is also held in position by blade guides 54a and 54b which are secured to the receiving edge or leading edge 51 of the disk separator 50. By this arrangement the receiving edge 51 is aligned at the same level as the band saw blade 38 and follows any deformations of the band saw blade so that the leading edge 51 and band saw blade 38 remain in alignment during the cutting operations.

As sea urchins 60 arrive at the cutting location 16 on the conveyor tracks 12a, 12b, 12c, the caps or disks are severed from the anterior side of the sea urchins by the band saw blade 38, pass over the leading edge 51 of the disk separator 50 and into the tray portion 84. As further disks are cut and pushed onto the tray portion 84 the curved wall 86 of the chute 85 is encountered diverting the sea urchin disks through the chute 85 to a location at the side of the conveyor 12 for appropriate disposal. As heretofore described the decapitated sea urchin shells with exposed gonad lobes progress in the direction of travel of conveyor 12 under the disk separator 50. Because there is a slight drop or fall off of the conveyor 12 following the spring loaded section under the aligner plate, there is ample room for passage of the decapitated sea urchin shells under the tray portion 84 of disk separator 50.

At the downstream end of the conveyor 12 a sea urchin shell chute 90 is provided as shown in FIG. 8 for receiving and collecting decapitated sea urchin shells, for example in a fresh salt water bin. The sea urchin gonad lobes can then be extracted from the sea urchin shells and be appropriately treated and packaged for shipment. In order to retrieve sea urchin shells from the conveyor 12, the shell chute 90 is formed at its leading edge 91 with a comb 92. The base of the comb is secured to the leading edge 91 of shell chute 90 with heavy duty tines 94 projecting toward the conveyor 12. The tines 94 are designed to lie within furrows on the conveyor surfaces of conveyor tracks 12a, 12b, 12c for "scooping up" sea urchin shells and directing them into the chute 90. At the same time the tines 94 of comb 92 clean the conveyor surface. The furrows in the conveyor track sections 12a, 12b, and 12c are visible in FIGS. 2 and 2A and lie between the slotted links 34 of the flexible conveyor surface. According to this embodiment of the invention, the flights 30 of the conveyor 12 are notched to pass through the tines 94 of the comb 92.

According to an alternative embodiment of the invention, an automated loader can be mounted at the upstream end of conveyor 12 for loading sea urchins onto the conveyor. The automated loader may for example include a hopper for receiving between 50 and 100 pounds of whole live sea urchins for transfer to the conveyor of the sea urchin processing machine. An inclined Archimedes screw is mounted at the base of the bulk hopper for loading each conveyor track. Water flushing jets can be provided for cleaning seaweed and shells from the live whole sea urchins prior to transfer to the respective conveyor tracks or belts. An electronically monitored visual sorting device may be used to recognize the anterior mouth side of the sea urchin and prompt an automatic reorientation of the sea urchin so that the anterior mouth side faces up with the domed posterior side facing down. Alternatively, spring loaded pressure plates can also be used for properly orienting the sea urchins. Automated sizing devices can also be used to reject any sea urchins which are too small for cutting. A distribution device for example combining spring plates, trip bars and chutes can be used to distribute the properly oriented individual sea urchins to the respective conveyor tracks or belts.

While the invention is described with reference to particular example embodiments it is intended to cover all modifications and equivalents within the scope of the following claims.

We claim:

1. A machine for processing sea urchins, said sea urchins having a sea urchin shell with a posterior domed side and an anterior mouth side, and sea urchin spines, comprising:
   a conveyor constructed for receiving sea urchins with the mouth side of the sea urchin shells facing away from the conveyor, and for transporting sea urchins through a cutting location;
   a cutter mounted over the conveyor at the cutting location, said cutter comprising a cutting element constructed for producing a transverse cut across the mouth side of the sea urchin shells generally transverse to the conveyor, said cutting element being spaced from the conveyor;
   an extended aligning plane oriented generally parallel to the conveyor at the cutting location on the opposite side of the cutting element from the conveyor, said aligning plane being arranged for contacting the mouth side of the sea urchin shells and for aligning and maintaining orientation of the sea urchins on the conveyor with the mouth side of the sea urchin shells facing and contacting the aligning plane as the sea urchins are transported through the cutting location;
   said cutting element being spaced a selected cutting distance from the aligning plane for cutting a disk from the mouth side of the sea urchin shells having sufficient thickness to expose the gonad lobes for removal from the sea urchin shells;
   and spring means mounted on the side of the conveyor opposite the aligning surface, said spring means being constructed to spring load the conveyor in the direction of the aligning plane for pressing the mouth side of sea urchin shells against the aligning plane as the sea urchins are transported through the cutting location.

2. The machine of claim 1 wherein the conveyor comprises a conveyor surface formed with openings for receiving sea urchin spines on the domed side of sea urchin shells to facilitate retaining sea urchins on the conveyor oriented with the mouth side facing away from the conveyor.

3. The machine of claim 2 wherein the conveyor surface comprises slotted links, wherein the openings are slots in the slotted links, and wherein the conveyor surface is also formed with flights having sufficient height for pushing against the sea urchins transported on the conveyor.

4. The machine of claim 1 wherein the cutter comprises a band saw and wherein the cutting element is a band saw blade mounted across the conveyor.

5. The machine of claim 1 wherein the cutter is a laser and wherein the cutting element is a laser beam.

6. The machine of claim 1 wherein the aligning plane comprises an aligning plate formed with depending vanes defining channels aligned along the direction of travel of the conveyor and facing the conveyor for receiving sea urchin spines, the edges of the depending vanes defining the aligning plane for aligning and guiding the sea urchins through the cutting location with the mouth side of the sea urchin shell facing and contacting the edges of the vanes defining the aligning plane.

7. The machine of claim 6 wherein the extended aligning surface extends from a first location upstream from the cutting location relative to the direction of travel of the conveyor to a second location downstream from the cutting location relative to the direction of travel of the conveyor.

8. The machine of claim 1 wherein the spring means comprises a fixed frame on the side of the conveyor opposite the aligning surface, a set of springs mounted on the fixed frame, and a relatively moveable conveyor plate mounted on the other side of the set of springs from the fixed frame for contacting and pushing against the conveyor, said conveyor comprising a flexible conveyor surface spring biased by the set of springs and relatively moveable conveyor plate for pushing sea urchins transported by the conveyor against the aligning plane.

9. The machine of claim 1 wherein the cutting distance between the aligning plane and the relatively thin elongate cutter element is in the range of approximately ⅛ inch to 3/16 inch (0.3 cm to 0.45 cm).

10. The machine of claim 7 wherein the aligning plane is adjustable for varying the cutting distance between the cutting element and aligning plane for varying the thickness of the disk cut from the mouth side of the sea urchin shell.

11. The machine of claim 10 wherein the cutting distance between the aligning plane and the elongate cutter element is in the range of approximately ⅛ inch to 3/16 inch (0.3 cm to 0.45 cm).

12. The machine of claim 1 comprising a disk separator formed with a disk tray portion and disk chute portion, said disk separator being mounted over the conveyor at the cutting location adjacent to the elongate cutting element on the downstream side, the disk tray portion of said separator being aligned with the elongate cutting element for receiving disks cut from the mouth side of sea urchins, said disk chute portion being constructed for diverting said disks to the side of the conveyor while sea urchin shells pass below the disk separator on the conveyor.

13. The machine of claim 12 wherein the cutter comprises a band saw and the elongate cutting element is a band saw blade, and wherein the disk tray portion of the disk separator is formed with band saw blade guides at a receiving edge of the disk tray constructed to maintain the band saw blade and receiving edge in alignment at the same level for receiving said disks on the disk tray portion of the disk separator while sea urchin shells pass below the disk separator on the conveyor.

14. The machine of claim 1 comprising a sea urchin shell receiver mounted at the downstream end of the conveyor, said shell receiver comprising an inclined shell tray for receiving decapitated sea urchin shells, said shell tray having a receiving edge adjacent to the downstream end of the conveyor, and a comb secured to the receiving edge, said comb being formed with tines extending toward the surface of the conveyor for receiving sea urchin shells, said conveyor being formed with notched flights for passing through the tines.

15. A machine for processing sea urchins, said sea urchins having a posterior domed side and an anterior mouth side, and sea urchin spines, comprising:

a conveyor constructed for receiving sea urchins with the mouth side of the sea urchin shells facing away from the conveyor, and for transporting sea urchins through a cutting location;

a band saw mounted over the conveyor at the cutting location, said band saw comprising a relatively thin elongate band saw blade spaced from the conveyor and oriented for producing a transverse cut across the mouth side of sea urchin shells generally transverse to the conveyor;

an extended aligning plane oriented generally parallel to the conveyor at the cutting location on the other side of the elongate cutting element from the conveyor, said aligning plane being arranged for contacting the mouth side of the sea urchin shells and for aligning and maintaining orientation of the sea urchins on the conveyor with the mouth side of the sea urchin shells facing and contacting the aligning plane as the sea urchins are transported through the cutting location, said aligning plane comprising an aligning plate formed with depending vanes defining channels aligned along the direction of travel of the conveyor and facing the conveyor for receiving sea urchin spines, the edges of the depending vanes defining the aligning plane aligning and guiding the sea urchins through the cutting location using the sea urchin spines with the mouth side of the sea urchin shell facing and contacting the edges of the vanes defining the aligning plane;

said elongate aligning plane being secured at a fixed location relative to the cutter, said band saw blade being spaced a selected cutting distance from the elongate aligning plane for cutting a disk from the mouth side of the sea urchin shells having sufficient thickness to expose the lobes for removal from the sea urchin shells;

and spring means mounted on the side of the conveyor opposite the aligning surface, said spring means being constructed to spring load the conveyor in the direction of the aligning surface for pressing the mouth side of sea urchin shells against the aligning surface as the sea urchins are transported through the cutter location.

16. The machine of claim 15 wherein the spring means comprises a fixed frame on the side of the conveyor opposite the aligning surface, a set of springs mounted on the fixed frame, and a relatively moveable conveyor plate mounted on the other side of the set of springs from the fixed frame for contacting and pushing against the conveyor, said conveyor comprising a flexible conveyor surface spring biased by the set of springs and relatively moveable conveyor plate for pushing sea urchins transported on the conveyor against the aligning plane.

17. The machine of claim 15 wherein the cutting distance between the aligning plane and the relatively thin elongate band saw blade is in the range of approximately ⅛ inch to 3/16 inch (0.3 cm to 0.45 cm).

18. The machine of claim 15 wherein the conveyor comprises a conveyor surface formed by flexibly joined slotted links with slotted openings for receiving sea urchin spines on the domed side of sea urchin shells to facilitate retaining sea urchins oriented with the mouth side facing away from the conveyor.

19. The machine of claim 15 comprising a disk separator formed with a disk tray portion and disk chute portion, said disk separator being mounted over the conveyor at the cutting location adjacent to the elongate cutting element on the downstream side, the disk tray portion of said separator being aligned with the elongate cutting element for receiving disks cut from the mouth side of sea urchins, said disk chute portion being constructed for diverting said disks to the side of the conveyor while sea urchin shells pass below the disk separator on the conveyor, said disk tray portion of the disk separator being formed with band saw blade guides at a receiving edge of the disk tray constructed to maintain the band saw blade and receiving edge in alignment at the same level for receiving said disks on the disk tray portion of the disk separator while sea urchin shells pass below the disk separator on the conveyor.

20. A method of processing sea urchins for extracting gonads from the sea urchin shells said sea urchins having a posterior domed side and anterior mouth side, and sea urchin spines, comprising:

orienting the sea urchins with the mouth side of the sea urchin shells facing toward a cutting location;

aligning the sea urchins by pressing the mouth side of the sea urchin shells against an aligning plane;

spacing a thin elongate cutting element a selected cutting distance from the aligning plane at the cutting location;

conveying the sea urchins through the cutting location and cutting a disk from the mouth side of the sea urchin shells having sufficient thickness to expose the gonad lobes for removal from the sea urchin shells.

21. The method of claim 20 wherein the step of conveying the sea urchins through the cutting location comprises transporting the sea urchins on a flexible conveyor surface and spring loading the flexible conveyor surface in the direction of the aligning plane for pressing the mouth side of sea urchin shells against the aligning plane.

22. The method of claim 21 wherein the step of aligning the sea urchins comprises pressing the mouth side of the sea urchin shells against an aligning plate formed with depending vanes defining channels aligned along the direction of travel of the flexible conveyor surface and facing the flexible conveyor surface, receiving and engaging sea urchin spines in the respective channels, pressing the mouth side of sea urchins against the lower edges of the depending vanes, and aligning and guiding the sea urchins using said spines and depending vanes.

23. The method of claim 20 comprising the step of forming the flexible conveyor surface with slotted openings and receiving and engaging sea urchin spines on the domed side of sea urchins in the slotted openings of the flexible conveyor surface for orienting the sea urchins with the mouth side of the sea urchin shells facing toward a cutting location.

24. The method of claim 22 wherein the step of cutting a disk from the mouth side of the sea urchin shells comprises cutting the disk using a relatively thin band saw blade oriented generally across the flexible conveying surface and generally parallel to the flexible conveyor surface.

25. The method of claim 20 comprising varying the cutting distance between the thin elongate cutting element and aligning plane according to the type or species of sea urchin.

26. The method of claim 25 comprising the initial step of selectively cutting the length of sea urchin spines for processing according to the type or species of sea urchins.

27. The method of claim 24 comprising the step of removing disks cut from the mouth side of sea urchin shells by aligning a receiving edge of a disk separator tray with the band saw blade on the downstream side and diverting disks received on the disk separator tray to a separate location from decapitated sea urchin shells.

* * * * *